United States Patent
Watanabe et al.

(10) Patent No.: US 10,816,262 B2
(45) Date of Patent: Oct. 27, 2020

(54) PRODUCTION EQUIPMENT AND PRODUCTION METHOD OF LIQUEFIED HYDROGEN AND LIQUEFIED NATURAL GAS

(71) Applicant: JGC CORPORATION, Yokohama (JP)

(72) Inventors: Yoshiyuki Watanabe, Kanagawa (JP); Hidefumi Omori, Kanagawa (JP); Toru Matsuhara, Kanagawa (JP); Shintaro Watanabe, Kanagawa (JP); Toru Nakayama, Kanagawa (JP)

(73) Assignee: JGC CORPORATION, Yokohama (JP)

( * ) Notice: Subject to any disclaimer, the term of this patent is extended or adjusted under 35 U.S.C. 154(b) by 131 days.

(21) Appl. No.: 16/077,484

(22) PCT Filed: Mar. 10, 2016

(86) PCT No.: PCT/JP2016/001347
§ 371 (c)(1),
(2) Date: Aug. 13, 2018

(87) PCT Pub. No.: WO2017/154044
PCT Pub. Date: Sep. 14, 2017

(65) Prior Publication Data
US 2019/0063824 A1    Feb. 28, 2019

(51) Int. Cl.
*F25J 1/02*    (2006.01)
*F25J 1/00*    (2006.01)
(Continued)

(52) U.S. Cl.
CPC ............. *F25J 1/001* (2013.01); *C01B 3/38* (2013.01); *C01B 3/506* (2013.01); *F25B 9/00* (2013.01);
(Continued)

(58) Field of Classification Search
CPC ........ F25J 1/0022; F25J 1/0067; F25J 1/0065; F25J 1/0092; F25J 1/0087; F25J 1/001;
(Continued)

(56) References Cited

U.S. PATENT DOCUMENTS

| | | | |
|---|---|---|---|
| 2010/0083695 A1 | 4/2010 | Kundig | |
| 2015/0068246 A1* | 3/2015 | Hakamade | F25B 9/02 62/607 |
| 2017/0328631 A1* | 11/2017 | Kobayashi | F25J 1/0022 |

FOREIGN PATENT DOCUMENTS

| | | |
|---|---|---|
| CN | 103697659 | 4/2014 |
| EA | 006062 | 8/2005 |

(Continued)

OTHER PUBLICATIONS

CN103697659 translation (Year: 2014).*
(Continued)

*Primary Examiner* — Brian M King
(74) *Attorney, Agent, or Firm* — JCIPRNET

(57) ABSTRACT

Provided is a production facility for liquefied hydrogen and a liquefied natural gas from a natural gas, including: a first heat exchanger configured to cool a hydrogen gas through heat exchange between the hydrogen gas and a mixed refrigerant for liquefying a natural gas containing a plurality of kinds of refrigerants selected from the group consisting of methane, ethane, propane, and nitrogen; a second heat exchanger configured to cool the mixed refrigerant through heat exchange between the mixed refrigerant and propane; and a third heat exchanger configured to cool the hydrogen gas through heat exchange between the hydrogen gas and a refrigerant containing hydrogen or helium, wherein the first heat exchanger has a precooling temperature of from −100° C. to −160° C.

6 Claims, 7 Drawing Sheets

(51) Int. Cl.
  *C01B 3/38* (2006.01)
  *F25B 9/00* (2006.01)
  *C01B 3/50* (2006.01)
(52) U.S. Cl.
  CPC .............. *F25J 1/004* (2013.01); *F25J 1/005* (2013.01); *F25J 1/0022* (2013.01); *F25J 1/0052* (2013.01); *F25J 1/0065* (2013.01); *F25J 1/0067* (2013.01); *F25J 1/0072* (2013.01); *F25J 1/0087* (2013.01); *F25J 1/021* (2013.01); *F25J 1/0211* (2013.01); *F25J 1/0217* (2013.01); *F25J 1/0229* (2013.01); *F25J 1/0236* (2013.01); *C01B 2203/0227* (2013.01); *C01B 2203/043* (2013.01); *C01B 2203/046* (2013.01); *C01B 2203/048* (2013.01); *C01B 2203/0415* (2013.01); *C01B 2203/0495* (2013.01); *C01B 2203/127* (2013.01); *F25J 2210/60* (2013.01); *F25J 2215/10* (2013.01); *F25J 2220/02* (2013.01); *F25J 2220/60* (2013.01); *F25J 2220/66* (2013.01); *F25J 2260/60* (2013.01); *F25J 2260/80* (2013.01); *F25J 2270/16* (2013.01)
(58) Field of Classification Search
  CPC ...... F25J 1/005; F25J 2220/66; F25J 2215/10; F25J 2220/60; F25J 2220/62
  See application file for complete search history.

(56) References Cited

FOREIGN PATENT DOCUMENTS

| | | |
|---|---|---|
| JP | H06-241647 | 9/1994 |
| JP | H08-178520 | 7/1996 |
| JP | H09-303954 | 11/1997 |
| JP | 2002-243360 | 8/2002 |
| JP | 2009-540259 | 11/2009 |
| JP | 2011-237100 | 11/2011 |
| JP | 2012-237554 | 12/2012 |
| RU | 2350553 | 3/2009 |
| WO | 2007114277 | 10/2007 |
| WO | 2008139536 | 11/2008 |

OTHER PUBLICATIONS

"Office Action of Russian Counterpart Application," with English translation thereof, dated Jul. 17, 2019, p. 1-p. 16.

"International Search Report (Form PCT/ISA/210) of PCT/JP2016/001347", dated May 31, 2016, with English translation thereof, pp. 1-4.

* cited by examiner

PRODUCTION EQUIPMENT AND PRODUCTION METHOD OF LIQUEFIED HYDROGEN AND LIQUEFIED NATURAL GAS

CROSS-REFERENCE TO RELATED APPLICATION

This application is a 371 application of International PCT application serial no. PCT/JP2016/001347, filed on Mar. 10, 2016. The entirety of the above-mentioned patent application is hereby incorporated by reference herein and made a part of this specification.

TECHNICAL FIELD

The present invention relates to a novel production facility and production method for liquefied hydrogen and a liquefied natural gas. More specifically, the present invention relates to a novel production facility (or production method) for liquefied hydrogen combined with a production facility (or production method) for a liquefied natural gas.

BACKGROUND ART

It is known that both liquefied hydrogen and a liquefied natural gas (hereinafter also referred to as "LNG") can be produced from a natural gas as a raw material.

The liquefied natural gas is produced, for example, in accordance with steps illustrated in FIG. 1. Specifically, a condensate, an acid gas, mercury, a water content, a heavy component, and the like contained in the natural gas serving as a raw material are removed, and then the natural gas is cooled with a refrigerant to a liquefaction temperature to provide the liquefied natural gas.

Meanwhile, the liquefied hydrogen is produced, for example, in accordance with steps illustrated in FIG. 2. Specifically, a condensate, an acid gas, mercury, sulfur, and the like contained in the natural gas serving as a raw material are removed, and then a reformed gas containing hydrogen, carbon monoxide, and carbon dioxide as main components is generated through a steam reforming reaction, a partial oxidation reaction, or the like. Next, carbon monoxide and steam are converted into hydrogen and carbon dioxide through a shift reaction, a carbon dioxide gas is removed in an acid gas removal step, and then carbon monoxide, carbon dioxide, methane, a water content, and the like contained in slight amounts are removed by a pressure swing adsorption (PSA) method or the like. Thus, a hydrogen gas having a high purity of about 99.999 mol %, is obtained. The resultant hydrogen gas is cooled with a refrigerant to a liquefaction temperature to provide the liquefied hydrogen.

Currently, much research and development, and many demonstration plans are made on hydrogen energy and a fuel cell, and it is expected that utilization of hydrogen is expanded in the future. Hydrogen is transported and stored more efficiently in the form of liquefied hydrogen than in the form of a general gas or a compressed gas. Hydrogen is liquefied at an extremely low temperature of about −253° C. In order to produce liquefied hydrogen, there is a problem in that large energy of from about 10.8 kWh/kg to about 12.7 kWh/kg is required.

Examples aimed at producing liquefied hydrogen while reducing specific energy consumption and production cost are known (for example, see Patent Literatures 1 to 3).

In addition, there are examples aimed at reducing energy required to liquefy hydrogen by utilizing cold heat for vaporizing a liquefied natural gas in a liquefied natural gas receiving terminal on a consuming country side (for example, see Patent Literatures 4 to 6).

However, the challenge for the widespread use of liquefied hydrogen in an energy application is to reduce energy involved in production of liquefied hydrogen and to reduce production cost. A novel and efficient production facility and production method for liquefied hydrogen capable of further reducing energy to be consumed for liquefaction of hydrogen are required.

CITATION LIST

Patent Literature

[Patent Literature 1] JP 06-241647 A
[Patent Literature 2] JP 08-178520 A
[Patent Literature 3] JP 09-303954 A
[Patent Literature 4] JP 2002-243360 A
[Patent Literature 5] JP 2009-540259 A
[Patent Literature 6] JP 2012-237554 A

SUMMARY OF INVENTION

An object of the present invention is to provide a novel and efficient production facility and production method for liquefied hydrogen capable of reducing energy to be consumed for liquefaction of hydrogen.

According to one aspect of the present invention, the following production facility and production method for liquefied hydrogen and a liquefied natural gas can be provided.

1. A production facility for liquefied hydrogen and a liquefied natural gas from a natural gas, including:
a first heat exchanger configured to cool a hydrogen gas through heat exchange between the hydrogen gas and a mixed refrigerant for liquefying a natural gas containing a plurality of kinds of refrigerants selected from the group consisting of methane, ethane, propane, and nitrogen;
a second heat exchanger configured to cool the mixed refrigerant through heat exchange between the mixed refrigerant and propane; and
a third heat exchanger configured to cool the hydrogen gas through heat exchange between the hydrogen gas and a refrigerant containing hydrogen or helium,
wherein the first heat exchanger has a precooling temperature of from −100° C. to −160° C.

2. A production facility for liquefied hydrogen and a liquefied natural gas according to Item 1,
wherein the production facility further includes at least one natural gas pretreatment unit selected from the group consisting of a condensate separation unit, an acid gas removal unit, and a mercury removal unit, and
wherein the production facility has a configuration in which a natural gas having been subjected to the pretreatment unit is divided into a liquefied hydrogen production line and a liquefied natural gas production line.

3. A production facility for liquefied hydrogen and a liquefied natural gas according to Item 2,
wherein the production facility includes the acid gas removal unit, and
wherein the production facility has a configuration in which the natural gas having been subjected to the acid gas removal unit is divided into the liquefied hydrogen production line and the liquefied natural gas production line.

4. A production facility for liquefied hydrogen and a liquefied natural gas according to any one of Items 1 to 3, wherein the production facility further includes an acid gas removal unit in a liquefied natural gas production line and an acid gas removal unit in a liquefied hydrogen production line, and wherein the production facility further includes a single acid gas stripping unit configured to collectively strip an acid gas absorbed in the acid gas removal unit in the liquefied natural gas production line and an acid gas absorbed in the acid gas removal unit in the liquefied hydrogen production line.

5. A production facility for liquefied hydrogen and a liquefied natural gas according to Item 4, wherein the production facility includes a plurality of acid gas removal units in the liquefied hydrogen production line, and wherein the single acid gas stripping unit is configured to collectively strip the acid gas absorbed in the acid gas removal unit in the liquefied natural gas production line and acid gases absorbed in the plurality of acid gas removal units in the liquefied hydrogen production line.

6. A production method for liquefied hydrogen and a liquefied natural gas from a natural gas, including:

using a refrigerant to be used for producing a liquefied natural gas in precooling for producing liquefied hydrogen, the precooling for producing liquefied hydrogen having a precooling temperature of from −100° C. to −160° C., the refrigerant for liquefying a natural gas including a mixed refrigerant containing a plurality of kinds of refrigerants selected from the group consisting of methane, ethane, propane, and nitrogen;

precooling the mixed refrigerant through heat exchange between the mixed refrigerant and propane; and cooling a hydrogen gas through heat exchange between the hydrogen gas and a refrigerant containing hydrogen or helium.

7. A production method for liquefied hydrogen and a liquefied natural gas according to Item 6, wherein the production method further includes subjecting a natural gas to at least one pretreatment selected from the group consisting of condensate separation treatment, acid gas removal treatment, and mercury removal treatment, followed by dividing the natural gas into a liquefied hydrogen production line and a liquefied natural gas production line.

8. A production method for liquefied hydrogen and a liquefied natural gas according to Item 7, wherein the production method includes dividing the natural gas having been subjected to the acid gas removal treatment into the liquefied hydrogen production line and the liquefied natural gas production line.

9. A production method for liquefied hydrogen and a liquefied natural gas according to any one of Items 6 to 8, wherein the production method further includes:

removing an acid gas from a natural gas in a liquefied natural gas production line and an acid gas from a natural gas in a liquefied hydrogen production line; and collectively stripping the acid gas having been removed from the natural gas in the liquefied natural gas production line and the acid gas having been removed from the natural gas in the liquefied hydrogen production line.

10. A production method for liquefied hydrogen and a liquefied natural gas according to Item 9, wherein the production method further includes:

removing an acid gas from a process gas after a shift reaction in the liquefied hydrogen production line; and collectively stripping the acid gas together with the acid gas having been removed from the natural gas in the liquefied natural gas production line and the acid gas having been removed from the natural gas in the liquefied hydrogen production line.

According to the present invention, it is possible to provide the novel and efficient production facility and production method for liquefied hydrogen and a liquefied natural gas capable of reducing energy to be consumed for liquefaction of hydrogen.

DESCRIPTION OF EMBODIMENTS

The present invention exhibits its effects particularly when liquefied hydrogen in an energy application is produced inexpensively in gas-producing countries. The gas-producing countries have hitherto often had a liquefied natural gas production plant in order to export a natural gas. The present invention contributes to realizing a reduction in consumption energy involved in liquefaction of hydrogen and a reduction in cost of a liquefied hydrogen production plant by constructing in parallel the liquefied natural gas production plant and the liquefied hydrogen production plant with each other so that these plants can be used in common and shared as a required facility. With this, the production cost of liquefied hydrogen can be reduced, and hence the present invention is expected to contribute to the widespread use of liquefied hydrogen in an energy application. There has hitherto been no example of a facility or a method in which production of a liquefied natural gas and production of liquefied hydrogen are combined with each other.

A production facility and production method for liquefied hydrogen and a liquefied natural gas according to preferred embodiments of the present invention are described below with reference to the attached drawings.

[Production Facility for Liquefied Hydrogen and Liquefied Natural Gas]

First, the production facility for liquefied hydrogen and a liquefied natural gas according to a preferred embodiment of the present invention is described.

A production facility for liquefied hydrogen and a liquefied natural gas according to one aspect of the present invention is a production facility for liquefied hydrogen and a liquefied natural gas from a natural gas, including: a first heat exchanger configured to cool a hydrogen gas through heat exchange between the hydrogen gas and a mixed refrigerant for liquefying a natural gas containing a plurality of kinds of refrigerants selected from the group consisting of methane, ethane, propane, and nitrogen; a second heat exchanger configured to cool the mixed refrigerant through heat exchange between the mixed refrigerant and propane; and a third heat exchanger configured to cool the hydrogen gas through heat exchange between the hydrogen gas and a refrigerant containing hydrogen or helium, wherein the first heat exchanger has a precooling temperature of from $-100°$ C. to $-160°$ C.

The production facility for liquefied hydrogen and a liquefied natural gas according to the aspect of the present invention can contribute to a reduction in consumption energy involved in liquefaction of hydrogen and a reduction in production cost of liquefied hydrogen by utilizing the mixed refrigerant for liquefying a natural gas for heat exchange between the mixed refrigerant and the hydrogen gas for producing liquefied hydrogen.

Figure 3:
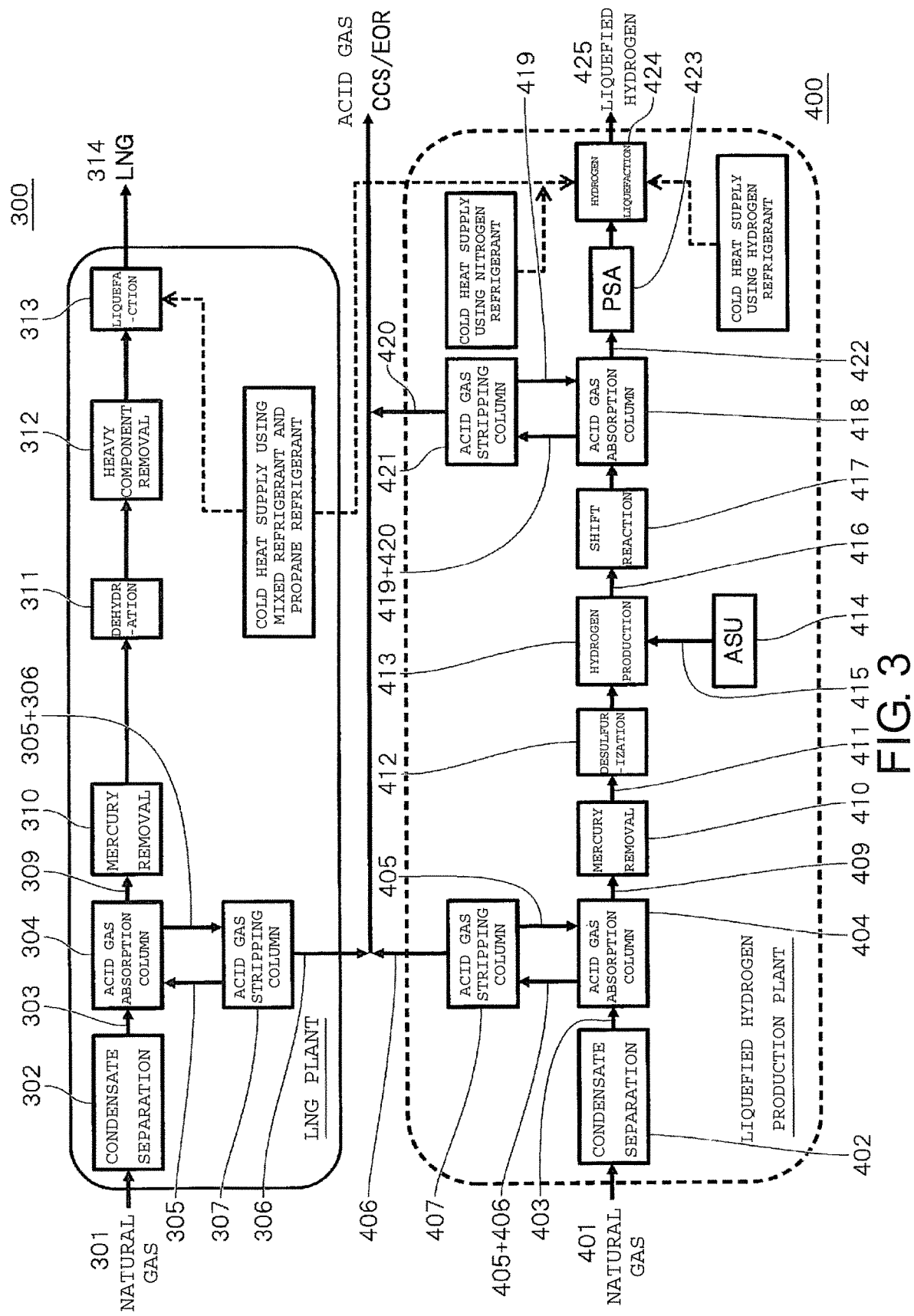
FIG. 3 is a step block diagram for illustrating a production process for liquefied hydrogen and a liquefied natural gas of the present invention.

The production facility according to the above-mentioned aspect of the present invention includes, for example, a process including steps illustrated in FIG. 3.

In addition, a production facility for liquefied hydrogen and a liquefied natural gas according to one aspect of the present invention may further include at least one natural gas pretreatment unit selected from the group consisting of a condensate separation unit, an acid gas removal unit, and a mercury removal unit, and have a configuration in which a natural gas having been subjected to the pretreatment unit is divided into a liquefied hydrogen production line and a liquefied natural gas production line.

With the above-mentioned feature, the natural gas pretreatment unit is shared between the liquefied hydrogen production line and the liquefied natural gas production line. Thus, the present invention can contribute to realizing a reduction in consumption energy involved in liquefaction of hydrogen and a reduction in cost of a liquefied hydrogen production plant.

Figure 6:
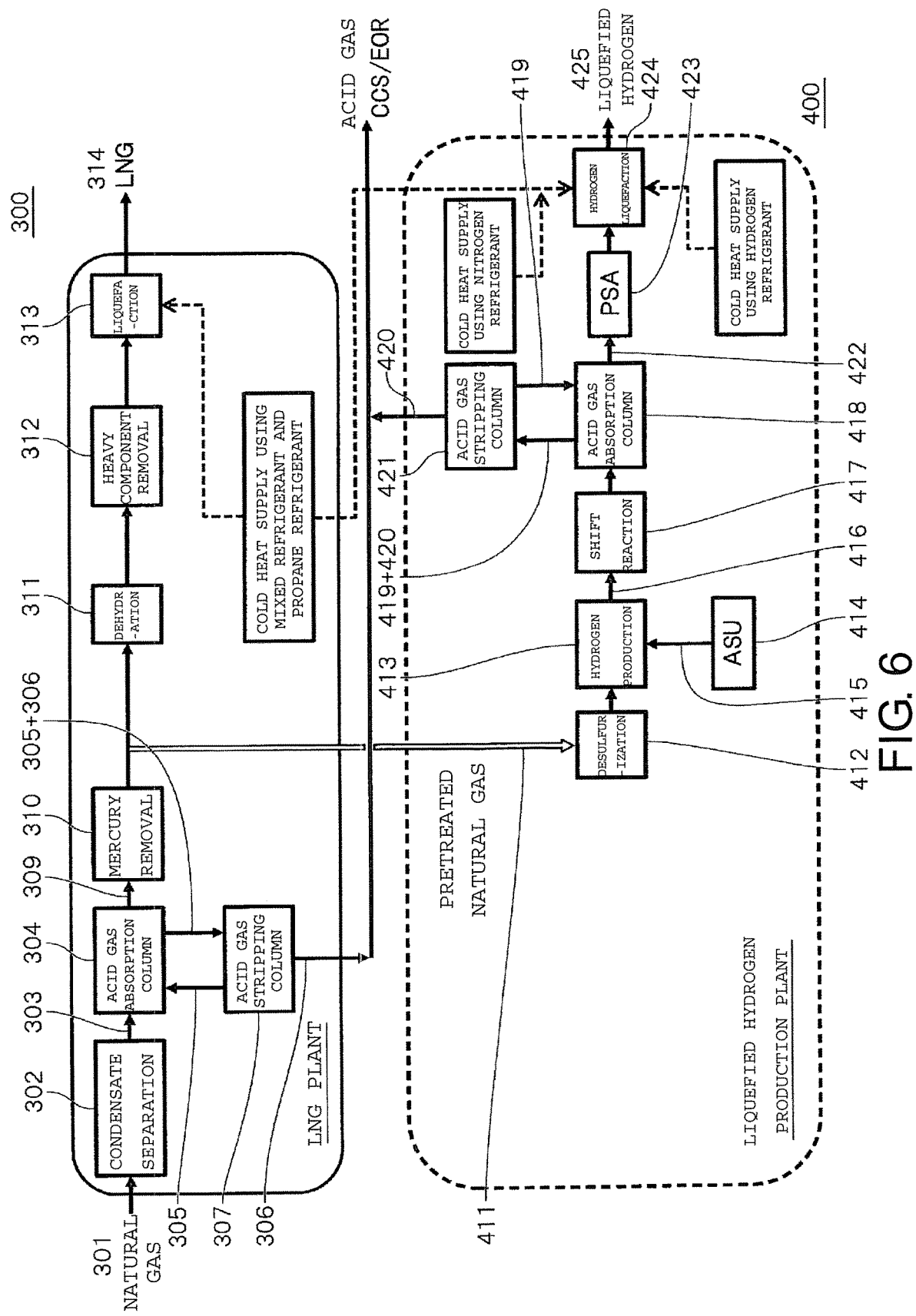
FIG. 6 is a diagram for illustrating a process used in Example 3 in which a pretreatment step is used in common.

The production facility according to the above-mentioned aspect of the present invention includes, for example, a process including steps illustrated in FIG. 6.

In the present invention, the liquefied hydrogen production line (liquefied hydrogen production plant) refers to a production line (production plant) in which impurities are removed from a natural gas serving as a raw material, a reformed gas containing hydrogen as a main component is generated through steam reforming, carbon monoxide in the reformed gas is converted into hydrogen through a shift reaction, and the resultant hydrogen is cooled to provide liquefied hydrogen.

In addition, in the present invention, the liquefied natural gas production line (liquefied natural gas production plant) refers to a production line (production plant) in which impurities are removed from a natural gas serving as a raw material, and the natural gas is cooled to provide a liquefied natural gas.

In addition, a production facility for liquefied hydrogen and a liquefied natural gas according to one aspect of the present invention may include the acid gas removal unit out of the above-mentioned natural gas pretreatment units, and have a configuration in which the natural gas having been subjected to the acid gas removal unit is divided into the liquefied hydrogen production line and the liquefied natural gas production line.

In addition, a production facility for liquefied hydrogen and a liquefied natural gas according to one aspect of the present invention may further include an acid gas removal unit in a liquefied natural gas production line and an acid gas removal unit in a liquefied hydrogen production line, and further include a single acid gas stripping unit configured to collectively strip an acid gas absorbed in the acid gas removal unit in the liquefied natural gas production line and an acid gas absorbed in the acid gas removal unit in the liquefied hydrogen production line.

With the above-mentioned feature, the acid gas stripping unit is shared between the liquefied natural gas production line and the liquefied hydrogen production line. Thus, the construction cost and operation cost of the production facility can be reduced.

Figure 7:
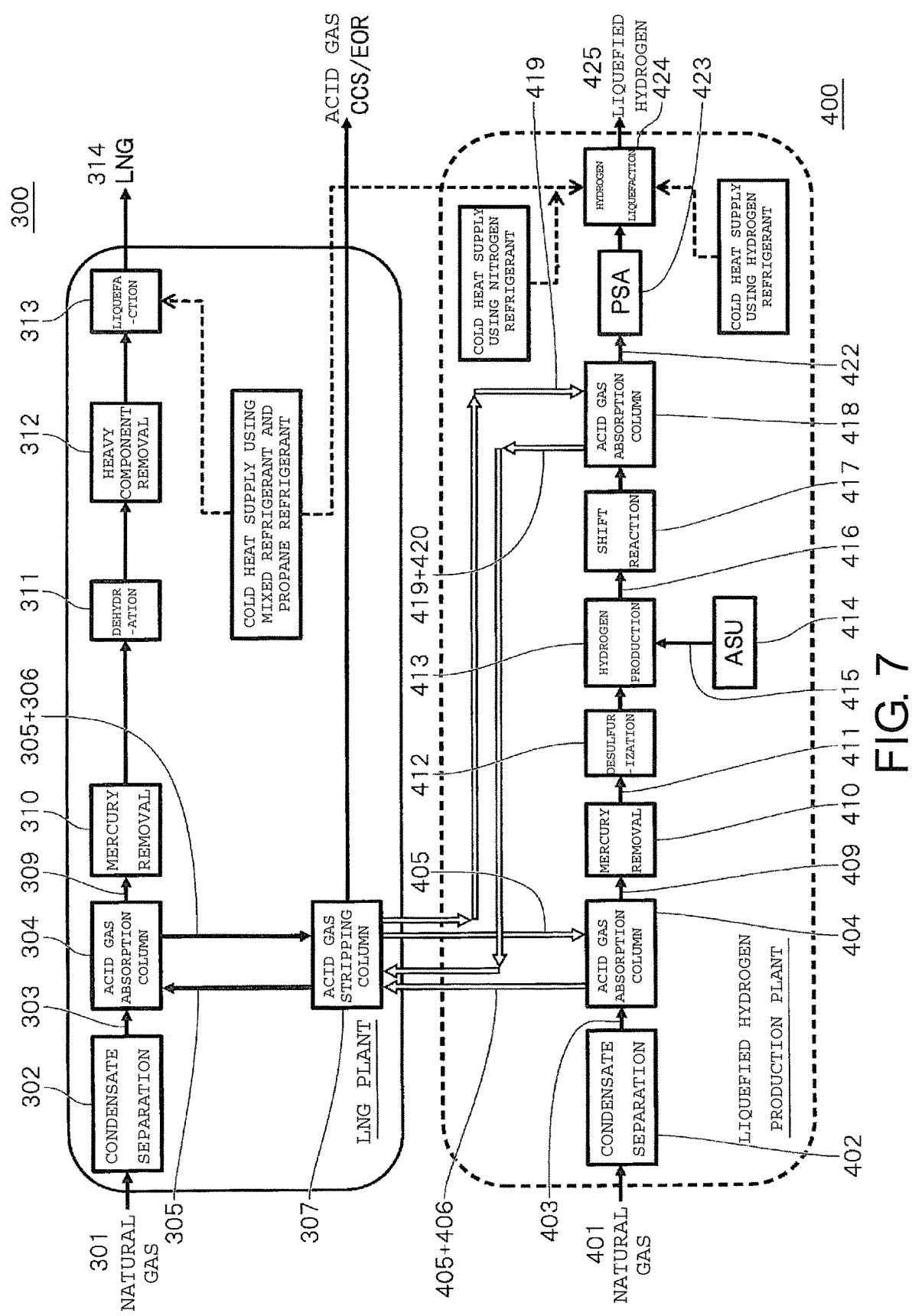
FIG. 7 is a diagram for illustrating a process used in Example 4.

The production facility according to the above-mentioned aspect of the present invention includes, for example, a process including steps illustrated in FIG. 7.

Further, a production facility for liquefied hydrogen and a liquefied natural gas according to one aspect of the present invention may include, in the above-mentioned aspect, a plurality of acid gas removal units in the liquefied hydrogen production line, and the single acid gas stripping unit may be configured to collectively strip the acid gas absorbed in the acid gas removal unit in the liquefied natural gas production line and acid gases absorbed in the plurality of acid gas removal units in the liquefied hydrogen production line.

With the above-mentioned feature, the liquefied hydrogen production line includes the plurality of acid gas removal units, and hence the acid gases can be certainly removed. In addition, the acid gas stripping unit is shared, and hence the construction cost and operation cost of the production facility can be reduced.

Other features of the production facility for liquefied hydrogen and a liquefied natural gas of the present invention may be the same as any appropriate features already known for a production line for producing liquefied hydrogen from a natural gas (liquefied hydrogen production plant) and a production line for producing a liquefied natural gas from a natural gas (liquefied natural gas production plant).

[Production Method for Liquefied Hydrogen and Liquefied Natural Gas]

Next, a production method for liquefied hydrogen and a liquefied natural gas according to a preferred embodiment of the present invention is described.

A production method for liquefied hydrogen and a liquefied natural gas according to one aspect of the present invention is a production method for liquefied hydrogen and a liquefied natural gas from a natural gas, including: using a refrigerant to be used for producing a liquefied natural gas in precooling for producing liquefied hydrogen, the precooling for producing liquefied hydrogen having a precooling temperature of from $-100°$ C. to $-160°$ C., the refrigerant for liquefying a natural gas including a mixed refrigerant containing a plurality of kinds of refrigerants selected from the group consisting of methane, ethane, propane, and nitrogen; precooling the mixed refrigerant through heat exchange between the mixed refrigerant and propane; and cooling a hydrogen gas through heat exchange between the hydrogen gas and a refrigerant containing hydrogen or helium.

The production method for liquefied hydrogen and a liquefied natural gas according to the aspect of the present invention can contribute to a reduction in consumption energy involved in liquefaction of hydrogen and a reduction in production cost of liquefied hydrogen by utilizing the mixed refrigerant for liquefying a natural gas in precooling for producing liquefied hydrogen.

The production method according to the above-mentioned aspect of the present invention may be performed using, for example, a process including steps illustrated in FIG. 3.

In addition, a production method for liquefied hydrogen and a liquefied natural gas according to one aspect of the present invention may further include subjecting a natural gas to at least one pretreatment selected from the group consisting of condensate separation treatment, acid gas removal treatment, and mercury removal treatment, followed by dividing the natural gas into a liquefied hydrogen production line and a liquefied natural gas production line.

With the above-mentioned feature, the pretreatment for the natural gas to be used is shared between the liquefied hydrogen production line and the liquefied natural gas production line. Thus, the present invention can contribute to realizing a reduction in consumption energy involved in liquefaction of hydrogen and a reduction in cost of a liquefied hydrogen production plant.

The production method according to the above-mentioned aspect of the present invention may be performed using, for example, a process including steps illustrated in FIG. 6.

In addition, a production method for liquefied hydrogen and a liquefied natural gas according to one aspect of the present invention may include dividing the natural gas having been subjected to the acid gas removal treatment out of the above-mentioned pretreatments for the natural gas into the liquefied hydrogen production line and the liquefied natural gas production line.

In addition, a production method for liquefied hydrogen and a liquefied natural gas according to one aspect of the present invention may further include: removing an acid gas from a natural gas in a liquefied natural gas production line and an acid gas from a natural gas in a liquefied hydrogen production line; and collectively stripping the acid gas having been removed from the natural gas in the liquefied natural gas production line and the acid gas having been removed from the natural gas in the liquefied hydrogen production line.

With the above-mentioned feature, the acid gases are collectively stripped in the liquefied natural gas production line and the liquefied hydrogen production line, and hence the construction cost and operation cost of the production facility can be reduced.

The production method according to the above-mentioned aspect of the present invention may be performed using, for example, a process including steps illustrated in FIG. 7.

Further, a production facility for liquefied hydrogen and a liquefied natural gas according to one aspect of the present invention may further include, in the above-mentioned aspect: removing an acid gas from a process gas after a shift reaction in the liquefied hydrogen production line; and collectively stripping the acid gas together with the acid gas having been removed from the natural gas in the liquefied natural gas production line and the acid gas having been removed from the natural gas in the liquefied hydrogen production line.

With the above-mentioned feature, the acid gases are collectively stripped in the liquefied natural gas production line and the liquefied hydrogen production line, and hence the construction cost and operation cost of the production facility can be reduced.

EXAMPLES

Now, the present invention is described in more detail by way of Examples. However, the scope of the present invention is by no means limited to the description of the following Examples.

In each of the following examples, simulation was performed on the assumption that a plant producing 100,000 tons/year of liquefied hydrogen was combined with a plant producing 5,000,000 tons/year of a liquefied natural gas. It is also assumed that a natural gas serving as a raw material is produced from a gas field, and is supplied in a required amount to the liquefied natural gas production plant and the liquefied hydrogen production plant. A liquefied natural gas produced and liquefied hydrogen produced are transported to their consumption areas.

Comparative Example 1

Figure 1:
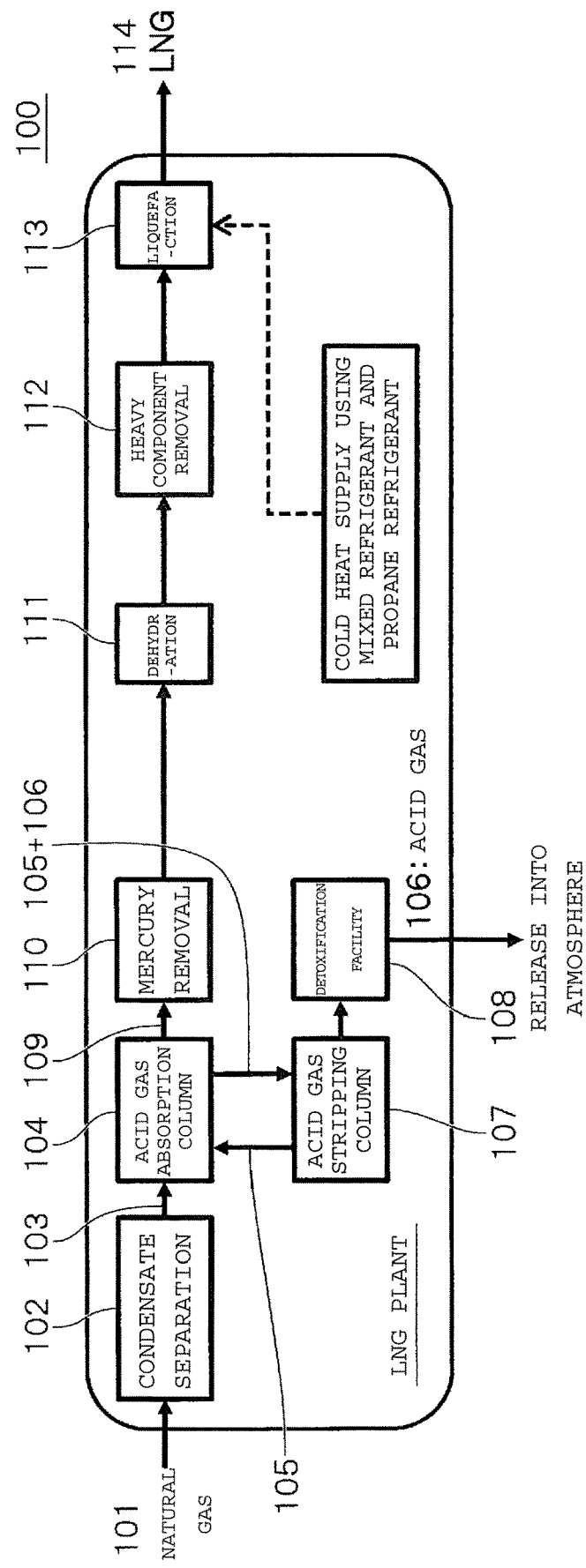
FIG. 1 is a step block diagram for illustrating a typical production process for a liquefied natural gas of related art.
Figure 2:
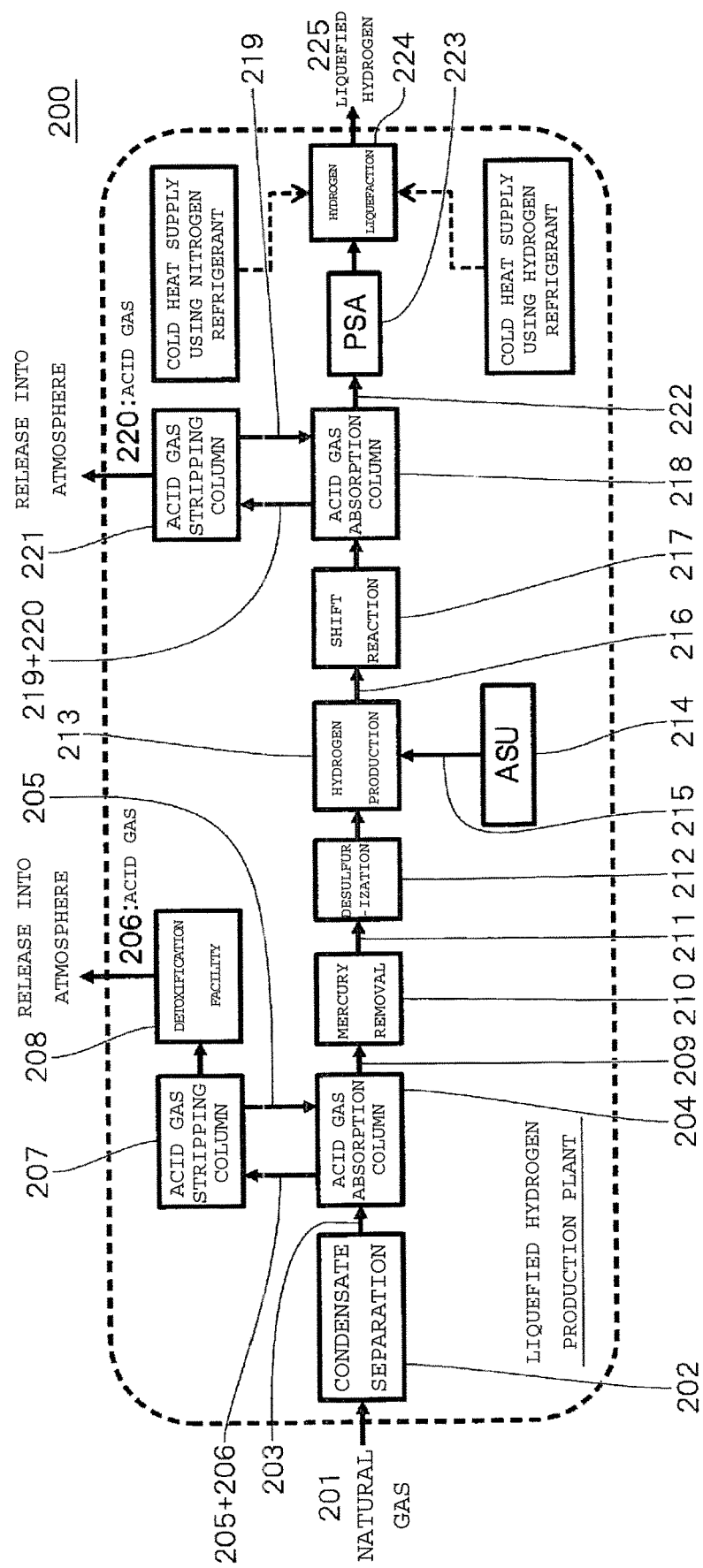
FIG. 2 is a step block diagram for illustrating a typical production process for liquefied hydrogen of related art.

Simulation was performed taking, as Comparative Example 1, a case in which a liquefied natural gas production plant including steps illustrated in FIG. 1 and using a mixed refrigerant and a propane refrigerant and a liquefied hydrogen production plant including steps illustrated in FIG. 2 and including precooling using a nitrogen refrigerant were independent of each other.

In a liquefied natural gas production plant 100, first, a condensate (heavy hydrocarbon) is separated from a natural gas 101 supplied from a gas field in a condensate separation unit 102, and thus a gas 103 containing methane as a main component is obtained. The gas contains an acid gas, such as carbon dioxide or hydrogen sulfide, and hence an acid gas 106 is absorbed and removed by a solvent 105 in an acid gas absorption column 104. The acid gas 106 having been absorbed in the acid gas absorption column 104 is stripped from the solvent 105 in a stripping column 107, is subjected to detoxification treatment in a detoxification facility 108 as required, and is then released into the atmosphere. Further, mercury is removed from a natural gas 109 from which the acid gas 106 has been removed in a mercury removal step 110, and the natural gas 109 is dehydrated in a dehydration step 111. Then, a heavy component remaining in a slight amount is removed in a heavy component removal step 112, and the resultant is liquefied in a liquefaction step 113 to provide a liquefied natural gas 114.

Meanwhile, hydrogen serving as a raw material for liquefied hydrogen is produced by reforming a natural gas. A liquefied hydrogen production plant 200 has the same process configuration as the liquefied natural gas production plant 100 for condensate separation (a condensate separation unit 202), acid gas absorption and removal (an acid gas absorption column 204 and an acid gas stripping column 207), and mercury removal (a mercury removal step 210).

A gas 211 having been subjected to those pretreatments is subjected to a desulfurization step (specifically, hydrodesulfurization and adsorptive desulfurization) 212, and is allowed to react with steam and as required oxygen 215 separated from air with an air separation unit (ASU) 214 in a reforming step (hydrogen production step) 213. Thus, a reformed gas 216 containing hydrogen as a main component is obtained. Next, in a shift reaction step 217, carbon monoxide in the reformed gas and steam are allowed to react with each other to be converted into hydrogen and carbon dioxide, and carbon dioxide 220 generated is absorbed and removed by a solvent 219 in an acid gas absorption column 218. The carbon dioxide 220 having been absorbed in the acid gas absorption column 218 is stripped from the solvent 219 in a stripping column 221, and is released into the atmosphere. A hydrogen gas 222 from which the carbon dioxide 220 has been removed is then increased in hydrogen purity by removing a water content therefrom in a pressure swing adsorption (PSA) step 223 or the like, and is then supplied as a raw material gas for a hydrogen liquefaction step 224.

Figure 4:
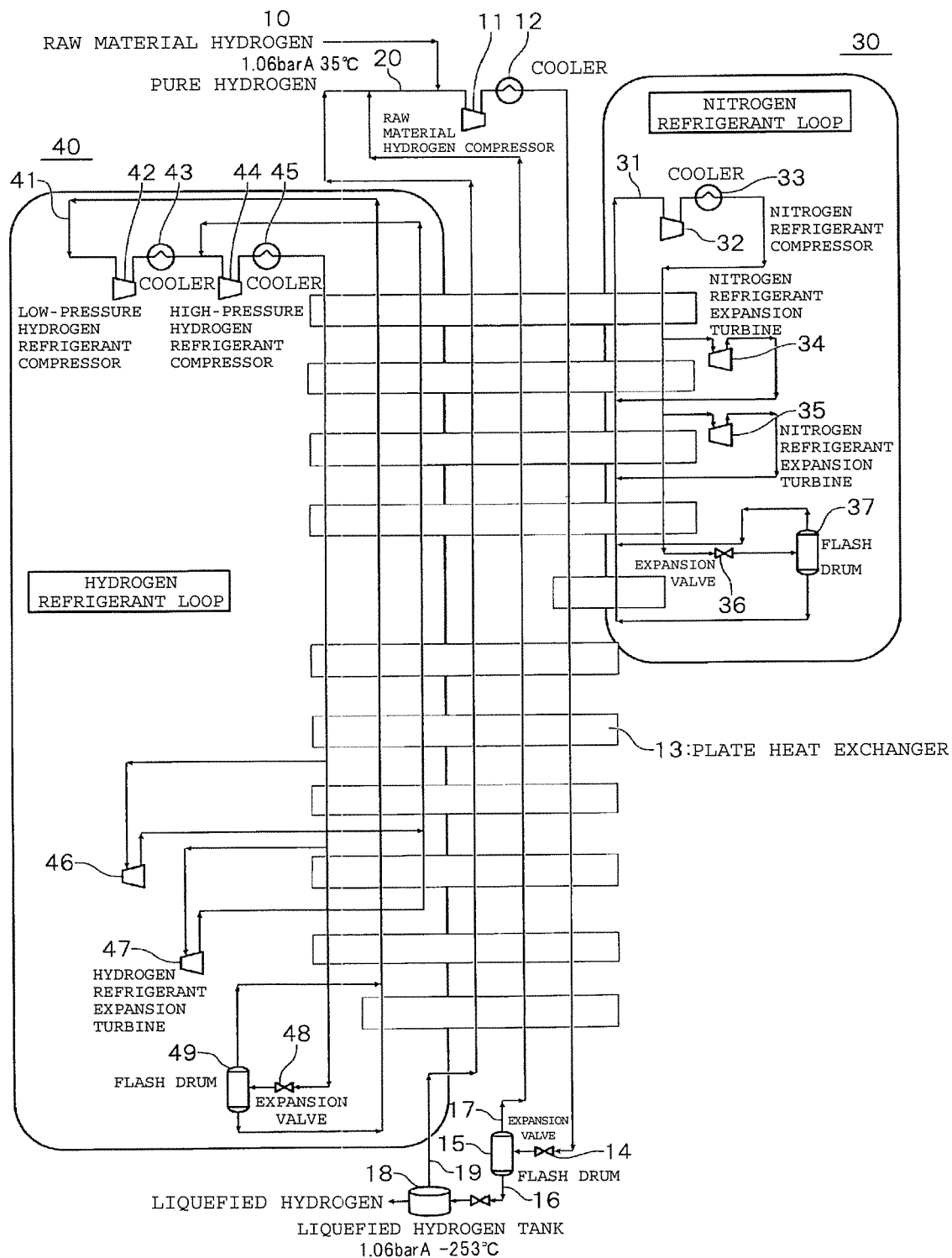
FIG. 4 is a diagram for schematically illustrating a hydrogen liquefaction step in Comparative Example 1.

The hydrogen liquefaction step in Comparative Example 1 is schematically illustrated in FIG. 4. In the hydrogen liquefaction step, the hydrogen gas is precooled through a refrigeration cycle using nitrogen as a refrigerant (nitrogen refrigerant loop) and is then cooled through a refrigeration cycle using hydrogen as a refrigerant (hydrogen refrigerant loop) to provide liquefied hydrogen.

In the course of this step, ortho-para conversion is performed using a catalyst as required.

Specifically, raw material hydrogen 10 for the hydrogen liquefaction step is increased in pressure with a raw material hydrogen compressor 11 and cooled with a cooler 12, and is then fed to a plate heat exchanger 13 and subjected to heat exchange with a nitrogen refrigerant and a hydrogen refrigerant. Next, the raw material hydrogen 10 is expanded through an expansion valve 14, and is separated in a flash drum 15 into liquefied hydrogen 16 and a hydrogen gas 17. The liquefied hydrogen 16 is stored in a liquefied hydrogen tank 18, and a boil off gas 19 vaporized in the tank is subjected to heat exchange with the raw material hydrogen, the hydrogen refrigerant, and the nitrogen refrigerant in the plate heat exchanger 13, and is then fed to the raw material hydrogen compressor 11 again as circulation hydrogen 20. Similarly, the hydrogen gas 17 having been separated in the flash drum 15 is subjected to heat exchange with the raw material hydrogen, the hydrogen refrigerant, and the nitrogen refrigerant in the plate heat exchanger 13, and is then fed to the raw material hydrogen compressor 11 again as the circulation hydrogen 20.

In a nitrogen refrigerant loop 30, a nitrogen refrigerant 31 is compressed with a nitrogen refrigerant compressor 32 and cooled with a cooler 33, and then, part of the nitrogen refrigerant is fed to the plate heat exchanger 13 and subjected to heat exchange with the raw material hydrogen after reduced in temperature with nitrogen refrigerant expansion turbines 34 and 35. In addition, the rest of the nitrogen refrigerant is separated into liquid nitrogen and a nitrogen gas in a flash drum 37 after expanded through an expansion valve 36, and the liquid nitrogen and the nitrogen gas are each fed to the plate heat exchanger 13 and subjected to heat exchange with the raw material hydrogen.

In a hydrogen refrigerant loop 40, a hydrogen refrigerant 41 is compressed with a low-pressure hydrogen refrigerant compressor 42 and cooled with a cooler 43, and is then compressed with a high-pressure hydrogen refrigerant compressor 44 and cooled with a cooler 45. Next, the hydrogen refrigerant 41 is fed to the plate heat exchanger 13 (and subjected to heat exchange with the nitrogen refrigerant, the hydrogen gas 17 derived from the raw material hydrogen and capable of being utilized as cold heat, the boil off gas 19 from the liquefied hydrogen tank 18, and a hydrogen refrigerant after passing through hydrogen refrigerant expansion turbines 46 and 47 and a flash drum 49), and then, part of the hydrogen refrigerant is reduced in temperature/liquefied with the hydrogen refrigerant expansion turbines 46 and 47. The rest of the hydrogen refrigerant is separated into liquefied hydrogen and a hydrogen gas in the flash drum 49 after expanded through an expansion valve 48, and the liquefied hydrogen and the hydrogen gas are each fed to the plate heat exchanger 13 again and subjected to heat exchange with the raw material hydrogen.

Process parameters in Comparative Example 1 are shown in Table 1. In addition, power required for liquefaction of hydrogen is shown in Table 2. The power of the raw material hydrogen compressor was 23.7 MW, the power of the hydrogen refrigerant compressors was 56.7 MW, and the power of the nitrogen refrigerant compressor was 35.5 MW. Power required for the compressors as a total of those values was 115.9 MW, and an energy consumption amount per unit production amount of liquefied hydrogen was 9.27 KWh/kg-LH$_2$.

TABLE 1

Process parameters in Comparative Example 1

| Fluid name | Flow rate [kg/hr] | Compressor inlet temperature [° C.] | Compressor inlet pressure [barA] | Compressor outlet pressure [barA] |
|---|---|---|---|---|
| Raw material hydrogen | 12,500 | 35 | 1.1 | 30.4 |
| Circulation hydrogen | 1,500 | — | — | — |
| Low-pressure hydrogen refrigerant | 5,000 | 35 | 1.1 | 6.1 |
| High-pressure hydrogen refrigerant | 60,500 | 35 | 6.1 | 40.5 |
| Nitrogen refrigerant | 443,900 | 35 | 1.2 | 22.6 |

The coolers at outlets of the raw material hydrogen compressor, the hydrogen refrigerant compressors, and the nitrogen refrigerant compressor were each able to perform cooling to 37° C.

TABLE 2

Comparison in power for liquefaction of hydrogen (300 tons/day)

| | Comparative Example 1 | Example 1 | Example 2 |
|---|---|---|---|
| Mixed refrigerant temperature [° C.] | — | −137 | −167 |
| Hydrogen precooling temperature using mixed refrigerant [° C.] | — | −106 | −158 |
| Power of raw material hydrogen compressor [MW] | 23.7 | 23.7 | 23.7 |
| Power of hydrogen refrigerant compressors [MW] *1 | 56.7 | 56.7 | 56.7 |
| Power of nitrogen refrigerant compressor [MW] *1 | 35.5 | 25.0 | 12.5 |
| Power of compressors using mixed refrigerant and propane refrigerant [MW] | — | 6.2 | 11.9 |
| Total power of compressors [MW] | 115.9 | 111.6 | 104.8 |
| Energy consumption amount [kWh/kg-LH$_2$] *1 | 9.27 (100%) | 8.93 (96.3%) | 8.39 (90.5%) |

*1 A numerical value obtained by subtracting power recovered in the expansion turbine from power required for the compressor Example 1

Figure 5:
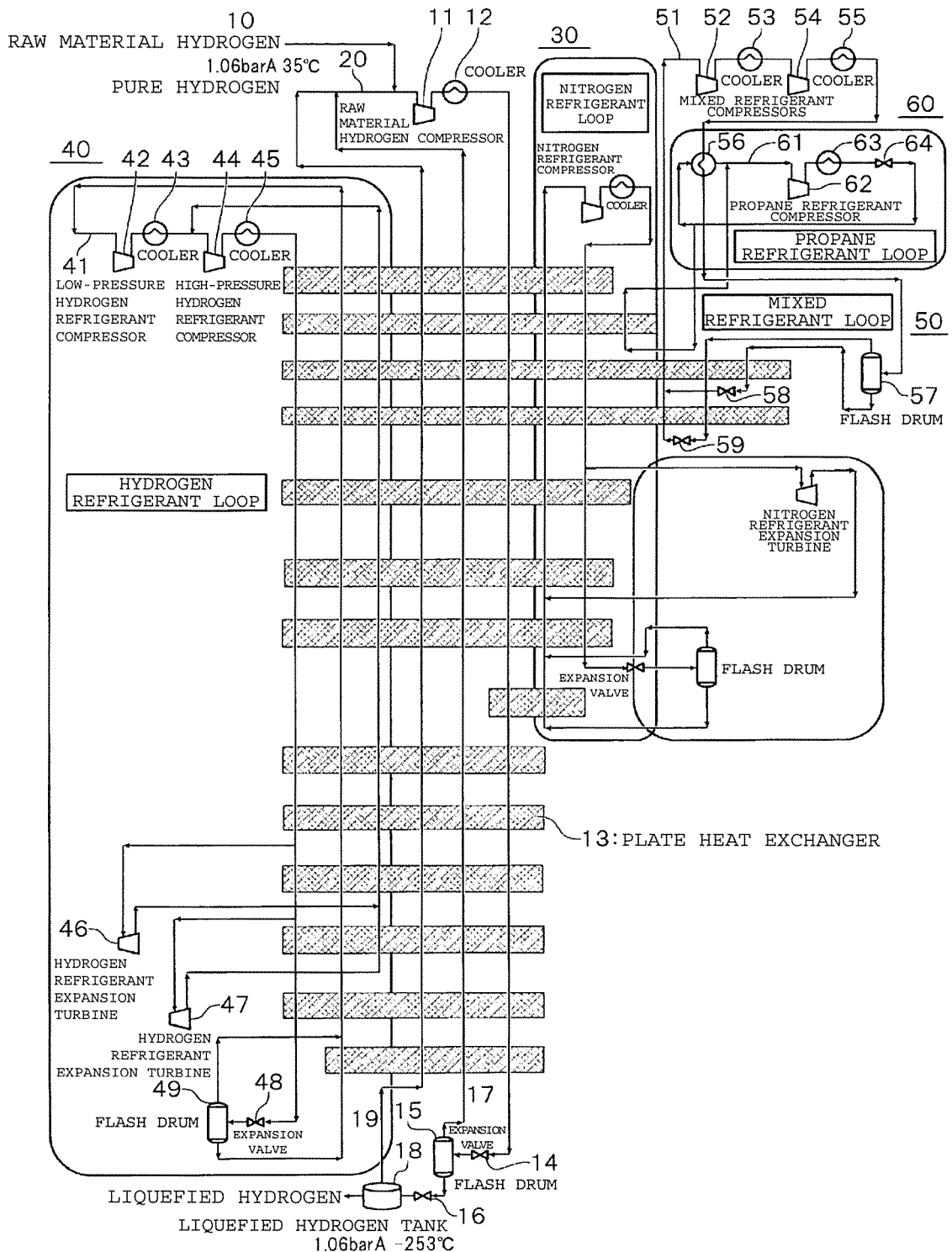
FIG. 5 is a diagram for schematically illustrating a hydrogen liquefaction step in Example 1.

Simulation was performed taking, as Example 1, a hydrogen liquefaction process illustrated in FIG. 3 and FIG. 5 in which a refrigerant to be used for producing a liquefied natural is used for precooling in liquefaction of hydrogen.

In a liquefied natural gas production plant 300, first, a condensate is separated from a natural gas 301 supplied from a gas field in a condensate separation unit 302, and thus a gas 303 containing methane as a main component is obtained. The gas contains an acid gas, such as carbon dioxide or hydrogen sulfide, and hence an acid gas 306 is absorbed and removed by a solvent 305 in an acid gas absorption column 304. The acid gas 306 having been absorbed in the acid gas absorption column 304 is stripped from the solvent 305 in a stripping column 307, and is preferably injected into the ground for carbon dioxide capture and storage (CCS) or enhanced oil recovery (EOR).

Further, mercury is removed from a natural gas 309 from which the acid gas 306 has been removed in a mercury removal step 310, and the natural gas 309 is dehydrated in a dehydration step 311. Then, a heavy component remaining in a slight amount is removed in a heavy component removal step 312, and the resultant is liquefied in a liquefaction step 313 to provide a liquefied natural gas 314.

A liquefied hydrogen production plant 400 has the same process configuration as the liquefied natural gas production plant 300 for condensate separation (a condensate separation unit 402), acid gas absorption and removal (an acid gas absorption column 404 and an acid gas stripping column 407), and mercury removal (a mercury removal step 410). An acid gas 406 having been removed from a natural gas 401 is preferably injected into the ground for CCS or EOR together with the acid gas 306 from the liquefied natural gas production plant 300.

A gas 411 having been subjected to those pretreatments is subjected to a desulfurization step (specifically, hydrodesulfurization and adsorptive desulfurization) 412, and is allowed to react with steam and as required oxygen 415 separated from air with an air separation unit (ASU) 414 in a reforming step (hydrogen production step) 413. Thus, a reformed gas 416 containing hydrogen as a main component is obtained. Next, in a shift reaction step 417, carbon monoxide in the reformed gas and steam are allowed to react with each other to be converted into hydrogen and carbon dioxide, and carbon dioxide 420 generated is absorbed and removed by a solvent 419 in an acid gas absorption column 418. The carbon dioxide 420 having been absorbed in the acid gas absorption column 418 is stripped from the solvent 419 in a stripping column 421, and is preferably injected into the ground for CCS or EOR together with the acid gases 306 and 406. A hydrogen gas 422 from which the carbon dioxide 420 has been removed is then increased in hydrogen purity by removing carbon monoxide, carbon dioxide, methane, a water content, and the like contained therein in slight amounts in a pressure swing adsorption (PSA) step 423 or the like, and is then supplied as a raw material gas for a hydrogen liquefaction step 424.

The hydrogen liquefaction step in Example 1 is schematically illustrated in FIG. 5. In the hydrogen liquefaction step, the hydrogen gas is precooled through a refrigeration cycle using nitrogen as a refrigerant (nitrogen refrigerant loop), a refrigeration cycle using a mixed refrigerant (mixed refrigerant loop), and a refrigeration cycle using propane as a refrigerant (propane refrigerant loop), and the hydrogen is then cooled through a refrigeration cycle using hydrogen as a refrigerant (hydrogen refrigerant loop) to provide liquefied hydrogen.

In the course of this step, ortho-para conversion is performed using a catalyst as required.

Specifically, the flow of the raw material hydrogen 10 in the hydrogen liquefaction step is the same as in the step used in Comparative Example 1 illustrated in FIG. 4 except that the precooling is performed through the refrigeration cycle using a mixed refrigerant (mixed refrigerant loop) and the refrigeration cycle using propane as a refrigerant (propane refrigerant loop) in addition to the refrigeration cycle using nitrogen as a refrigerant (nitrogen refrigerant loop).

The nitrogen refrigerant loop 30 is the same as in the step used in Comparative Example 1 illustrated in FIG. 4.

In a mixed refrigerant loop 50, a mixed refrigerant 51 is compressed with a low-pressure mixed refrigerant compressor 52 and cooled with a cooler 53, and is then compressed with a high-pressure hydrogen refrigerant compressor 54 and cooled with a cooler 55. After that, the mixed refrigerant 51 is subjected to heat exchange with a propane refrigerant 61 with a heat exchanger 56, and is subjected gas-liquid separation in a flash drum 57. Then, the resultant gas and liquid are each fed to the plate heat exchanger 13 and cooled with the boil off gas, the nitrogen refrigerant, and the hydrogen refrigerant. Next, the resultant gas and liquid are fed to the plate heat exchanger 13 again through expansion valves 58 and 59 to perform precooling of the hydrogen gas, and are then fed to the low-pressure mixed refrigerant compressor 52 again.

In a propane refrigerant loop 60, the propane refrigerant 61 is compressed with a propane refrigerant compressor 62 and cooled with a cooler 63, and then part of the propane refrigerant is subjected to heat exchange with the mixed refrigerant 51 with the heat exchanger 56 through an expansion valve 64. The rest of the propane refrigerant is fed to the plate heat exchanger 13 again to perform precooling of the hydrogen gas, and is then fed to the propane refrigerant compressor 62 again.

The hydrogen refrigerant loop 40 is the same as in the step used in Comparative Example 1 illustrated in FIG. 4.

In Example 1, there was adopted a process in which hydrogen was precooled to −106° C. using the propane refrigerant and the mixed refrigerant cooled to −137° C., and thus the load of precooling using the nitrogen refrigerant was reduced. A reduction in energy consumption amount involved in liquefaction of hydrogen is expected because the propane refrigerant and the mixed refrigerant are each a refrigerant having less liquefaction power and higher efficiency than the nitrogen refrigerant. The composition of the mixed refrigerant is shown in Table 3.

TABLE 3

| Composition of mixed refrigerant in Examples 1 and 2 [mole fraction] | | |
|---|---|---|
| | Example 1 | Example 2 |
| Nitrogen | 0.036 | 0.091 |
| Methane | 0.444 | 0.377 |
| Ethane | 0.441 | 0.411 |
| Propane | 0.079 | 0.121 |

In Example 1, it was assumed that the acid gases having been absorbed in the acid gas absorption columns were stripped in the stripping columns, compressed, and then injected into the ground for CCS or EOR so that hydrogen unaccompanied by the generation of carbon dioxide was obtained in production of hydrogen through recovery and fixation of the acid gases to be generated in the production of hydrogen.

Process parameters in Example 1 are shown in Table 4. In addition, power required for liquefaction of hydrogen is shown in Table 2. Numerical values of expansion energies of hydrogen and nitrogen in consideration of powers recovered in the expansion turbines are shown in Table 2. The power of the raw material hydrogen compressor was 23.7 MW, the power of the hydrogen refrigerant compressors was 56.7 MW, the power of the nitrogen refrigerant compressor was 25.0 MW, and the power of the compressors using the mixed refrigerant and the propane refrigerant was 6.2 MW. Power required for the compressors as a total of those values was 111.6 MW. An energy consumption amount per unit production amount of liquefied hydrogen was 8.93 kWh/kg-$LH_2$.

TABLE 4

Process parameters in Example 1

| Fluid name | Flow rate [kg/hr] | Compressor inlet temperature [° C.] | Compressor inlet pressure [barA] | Compressor outlet pressure [barA] |
|---|---|---|---|---|
| Nitrogen refrigerant | 279,800 | 35 | 1.2 | 22.6 |
| Propane refrigerant | 80,100 | −37 | 1.3 | 22.0 |
| Mixed refrigerant | 39,500 | −36 | 5.2 | 56.0 |

* Other parameters are the same as in Comparative Example 1 (Table 1).

The coolers at outlets of the raw material hydrogen compressor, the hydrogen refrigerant compressors, the nitrogen refrigerant compressor, the propane refrigerant compressor, and the mixed refrigerant compressors were each able to perform cooling to 37° C.

As described above, it is revealed that energy required for liquefaction is reduced in Example 1 as compared to Comparative Example 1. In addition, a reduction in cost can be expected because the refrigerant to be used for producing a liquefied natural gas is used for precooling in liquefaction of hydrogen, which eliminates the need for arrangement of a new refrigerant facility for liquefaction of hydrogen. In the case of the plant producing 5,000,000 tons/year of a liquefied natural gas, power for producing the propane refrigerant and the mixed refrigerant to be used in producing a liquefied natural gas is 160 MW. Meanwhile, in the case of the plant producing 100,000 tons/year of liquefied hydrogen, power for producing the propane refrigerant and the mixed refrigerant to be used in producing liquefied hydrogen is 6 MW. Accordingly, when a production facility for the refrigerant to be used for producing a liquefied natural gas has power of 166 MW, also the power to be used for liquefaction of hydrogen can be covered.

Example 2

In Example 2, simulation was performed in the same manner as in Example 1 except that hydrogen was precooled to −158° C. using a mixed refrigerant cooled to −167° C. As compared to Example 1, a further reduction in energy consumption amount is expected through precooling of hydrogen to a lower temperature using the mixed refrigerant.

The composition of the mixed refrigerant and process parameters in Example 2 are shown in Table 3 and Table 5, respectively. In addition, power required for liquefaction of hydrogen is shown in Table 2. In Table 2, the power of the hydrogen refrigerant compressors and the power of the nitrogen refrigerant compressor are each represented by a numerical value obtained by subtracting power recovered in the expansion turbine from power required for the compressor. The power of the raw material hydrogen compressor was 23.7 MW, the power of the hydrogen refrigerant compressors was 56.7 MW, the power of the nitrogen refrigerant compressor was 12.5 MW, and the power of the compressors using the mixed refrigerant and the propane refrigerant was 11.9 MW. Power required for the compressors as a total of those values was 104.8 MW. An energy consumption amount per unit production amount of liquefied hydrogen was 8.39 kWh/kg-LH$_2$. As described above, it is revealed that energy required for liquefaction is further reduced in Example 2 as compared to Example 1.

TABLE 5

Process parameters in Example 2

| Fluid name | Flow rate [kg/hr] | Compressor inlet temperature [° C.] | Compressor inlet pressure [barA] | Compressor outlet pressure [barA] |
|---|---|---|---|---|
| Nitrogen refrigerant | 321,700 | 35 | 1.2 | 4.5 |
| Propane refrigerant | 122,700 | −37 | 1.3 | 22.0 |
| Mixed refrigerant | 86,400 | −36 | 3.2 | 48.3 |

* Other parameters are the same as in Comparative Example 1 (Table 1).

The coolers at outlets of the raw material hydrogen compressor, the hydrogen refrigerant compressors, the nitrogen refrigerant compressor, the propane refrigerant compressor, and the mixed refrigerant compressors were each able to perform cooling to 37° C.

Example 3

A process, which includes, in common, pretreatment steps for a natural gas serving as a raw material for producing a liquefied natural gas and pretreatment steps for a natural gas serving as a raw material for producing hydrogen to be supplied for production of liquefied hydrogen, is illustrated in FIG. 6 as Example 3.

As compared to FIG. 3, FIG. 6 is the same as FIG. 3 except that the condensate separation unit 402, the acid gas absorption column 404, the acid gas stripping column 407, and the mercury removal step 410 are not present in the liquefied hydrogen production plant 400. The same units, steps, and the like are denoted by the same reference numerals.

When the pretreatment steps for a natural gas are shared between a liquefied natural gas production process and a liquefied hydrogen production process, the number of units involved in condensate separation, acid gas removal, mercury removal, and the like can be reduced. As a result, a reduction in plant cost can be expected, and hence the production cost of liquefied hydrogen can be further reduced.

Example 4

A process in which an acid gas absorbed in an acid gas removal step of removing an acid gas contained in a natural gas serving as a raw material for producing a liquefied natural gas and an acid gas absorbed in an acid gas removal step of removing an acid gas contained in a reformed gas in the course of producing hydrogen to be supplied for production of liquefied hydrogen are stripped in the same stripping column is illustrated in FIG. 7 as Example 4.

As compared to FIG. 3, FIG. 7 is the same as FIG. 3 except that the acid gas stripping columns 407 and 421 are not present in the liquefied hydrogen production plant 400, and the acid gas stripping column 307 is used in common in the liquefied natural gas production plant 300. The same units, steps, and the like are denoted by the same reference numerals.

When the acid gases absorbed in the course of producing a liquefied natural gas and producing liquefied hydrogen are stripped in the same stripping column, the number of units involved in the stripping columns can be reduced. As a result, a reduction in plant cost can be expected, and hence the production cost of liquefied hydrogen can be further reduced.

The present invention described above is useful particularly when liquefied hydrogen in an energy application is produced inexpensively in gas-producing countries. The gas-producing countries have hitherto often had a liquefied natural gas plant in order to export a natural gas. The present invention contributes to realizing a reduction in consumption energy involved in liquefaction of hydrogen and a reduction in cost of a hydrogen liquefaction plant by combining the liquefied natural gas plant and the hydrogen liquefaction plant with each other so that these plants share a required facility. With this, the production cost of liquefied hydrogen can be reduced, and hence the present invention is expected to contribute to the widespread use of liquefied hydrogen in an energy application.

Some embodiments and/or Examples of the present invention are described in detail above, but a person skilled in the art could easily make various modifications to these illustrative embodiments and/or Examples without substantially departing from the novel teachings and effects of the present invention. Accordingly, those various modifications are encompassed in the scope of the present invention.

The invention claimed is:

1. A production facility for liquefied hydrogen and a liquefied natural gas from a natural gas, comprising:
    a first heat exchanger configured to cool a hydrogen gas through heat exchange between the hydrogen gas and a mixed refrigerant used for liquefying a natural gas containing a plurality of kinds of refrigerants selected from the group consisting of methane, ethane, propane, and nitrogen;
    a second heat exchanger configured to cool the mixed refrigerant through heat exchange between the mixed refrigerant and propane; and
    a third heat exchanger configured to cool the hydrogen gas through heat exchange between the hydrogen gas and a refrigerant containing hydrogen or helium,
    wherein the first heat exchanger provides precooling at a precooling temperature of from $-100°$ C. to $-160°$ C.;
    the production facility further comprises:
    a liquefied hydrogen production line comprising at least one acid gas removal unit;
    a liquefied natural gas production line comprising an acid gas removal unit; and
    a single acid gas stripping unit shared between the liquefied hydrogen production line and the liquefied natural gas production line, and configured to collectively strip an acid gas absorbed in the acid gas removal units of the liquefied hydrogen production line and the liquefied natural gas production line,
    wherein the liquefied natural gas production line is used for producing the liquefied natural gas and the liquefied hydrogen production line is used for producing a raw material hydrogen that is supplied as the hydrogen gas to the first heat exchanger.

2. The production facility for liquefied hydrogen and a liquefied natural gas according to claim 1,
    wherein the liquefied hydrogen production line and the liquefied natural gas production line further comprises at least one natural gas pretreatment unit selected from the group consisting of a condensate separation unit, and a mercury removal unit,
    so that a natural gas having been subjected to the pretreatment unit is divided into the liquefied hydrogen production line for producing the raw material hydrogen and the liquefied natural gas production line for producing the liquefied natural gas.

3. The production facility for liquefied hydrogen and a liquefied natural gas according to claim 1,
    wherein the production facility comprises a plurality of the acid gas removal units in the liquefied hydrogen production line, and
    wherein the single acid gas stripping unit is configured to collectively strip the acid gas absorbed in the acid gas removal unit in the liquefied natural gas production line and acid gases absorbed in the plurality of the acid gas removal units in the liquefied hydrogen production line.

4. A production method for liquefied hydrogen and a liquefied natural gas from a natural gas, comprising:
    dividing a natural gas into a liquefied hydrogen production line for producing a hydrogen gas and a liquefied natural gas production line for producing a liquefied natural gas;
    removing an acid gas from the natural gas in the liquefied natural gas production line and an acid gas from the natural gas in the liquefied hydrogen production line;
    collectively stripping the acid gas removed from the natural gas in the liquefied natural gas production line and the acid gas removed from the natural gas in the liquefied hydrogen production line;
    using a refrigerant for producing the liquefied natural gas in a precooling step for producing liquefied hydrogen,
        the precooling step for producing liquefied hydrogen having a precooling temperature of from $-100°$ C. to $-160°$ C.,
        the refrigerant for liquefying the natural gas comprising a mixed refrigerant containing a plurality of kinds of refrigerants selected from the group consisting of methane, ethane, propane, and nitrogen;
    precooling the mixed refrigerant through heat exchange between the mixed refrigerant and propane; and
    cooling the hydrogen gas supplied from the liquefied hydrogen production line through heat exchange between the hydrogen gas and a refrigerant containing hydrogen or helium.

5. The production method for liquefied hydrogen and a liquefied natural gas according to claim 4, wherein the production method further comprises subjecting the natural gas in each of the liquefied hydrogen production line and the liquefied natural gas production line to at least one pretreatment selected from the group consisting of condensate separation treatment and mercury removal treatment.

6. The production method for liquefied hydrogen and a liquefied natural gas according to claim 4, wherein the production method further comprises:
    removing another acid gas from a process gas which is produced after a shift reaction of a reformed gas containing hydrogen as a main component in the liquefied hydrogen production line; and
    collectively stripping the another acid gas produced after the shift reaction together with the acid gas removed from the natural gas in the liquefied natural gas production line and the acid gas removed from the natural gas in the liquefied hydrogen production line.

* * * * *